US008155883B2

(12) United States Patent
Yasuhara et al.

(10) Patent No.: US 8,155,883 B2
(45) Date of Patent: Apr. 10, 2012

(54) CURRENT POSITION INFORMATION REPORTING SYSTEM, INFORMATION CENTER APPARATUS, AND METHOD THEREOF

(75) Inventors: Shinji Yasuhara, Atsugi (JP); Masayuki Ohsugi, Sagamihara (JP); Tsuneyuki Watanabe, Isehara (JP); Maki Ueda, Yamato (JP); Yasuhisa Nakamura, Machida (JP); Daisuke Nakata, Tokyo (JP); Yasunori Kondo, Toride (JP); Takuya Hashimoto, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 727 days.

(21) Appl. No.: 12/237,790

(22) Filed: Sep. 25, 2008

(65) Prior Publication Data

US 2009/0088977 A1 Apr. 2, 2009

(30) Foreign Application Priority Data

Sep. 28, 2007 (JP) ................................. 2007-255592

(51) Int. Cl.
*G01C 21/00* (2006.01)
*G01S 1/00* (2006.01)
*G08G 1/16* (2006.01)

(52) U.S. Cl. ......................... 701/445; 701/489; 701/301

(58) Field of Classification Search .................. 701/214, 701/445, 489, 301
See application file for complete search history.

(56) References Cited

U.S. PATENT DOCUMENTS

| | | | | |
|---|---|---|---|---|
| 5,319,374 | A * | 6/1994 | Desai et al. | 342/387 |
| 5,983,161 | A * | 11/1999 | Lemelson et al. | 701/301 |
| 6,275,773 | B1 * | 8/2001 | Lemelson et al. | 701/301 |
| 6,472,978 | B1 * | 10/2002 | Takagi et al. | 340/435 |
| 6,487,500 | B2 * | 11/2002 | Lemelson et al. | 701/301 |
| 6,529,831 | B1 * | 3/2003 | Smith et al. | 701/301 |
| 6,861,959 | B1 * | 3/2005 | Torres Sabate et al. | 340/944 |
| 7,042,345 | B2 * | 5/2006 | Ellis | 340/436 |
| 7,209,831 | B2 * | 4/2007 | Hilliard et al. | 701/301 |

(Continued)

FOREIGN PATENT DOCUMENTS

JP 08-068651 3/1996

(Continued)

OTHER PUBLICATIONS

Sharke, Paul. "Smart Cars", Mechanical Engineering. New York: Mar. 2003. vol. 125, Iss. 3; p. 50.*

(Continued)

*Primary Examiner* — Robert Morgan
*Assistant Examiner* — Robert Sorey
(74) *Attorney, Agent, or Firm* — Global IP Counselors, LLP

(57) ABSTRACT

An information center apparatus has a communication section, a motion information calculating section, a communication delay time calculating section, a communication cycle waiting time calculating section, an error estimating section and a correcting section. The communication section acquires reported current position information of a first moving body apparatus and reports a corrected current position information to a second moving body apparatus. The error estimating section estimate an error in the reported current position information with respect to an actual current position of the first moving body apparatus based on motion information calculated by the motion information calculating section, communication delay times calculated by the communication delay time calculating section, and a communication cycle waiting time calculated by the communication cycle waiting time calculating section. The correcting section corrects the reported current position information using the error estimated by the error estimating section to obtain the corrected current position information.

8 Claims, 6 Drawing Sheets

U.S. PATENT DOCUMENTS

| | | | | |
|---|---|---|---|---|
| 7,541,046 | B1 * | 6/2009 | Sung et al. | 424/408 |
| 2002/0022927 | A1 * | 2/2002 | Lemelson et al. | 701/301 |
| 2003/0181163 | A1 * | 9/2003 | Ofuji et al. | 455/25 |
| 2004/0258279 | A1 * | 12/2004 | Hirvonen et al. | 382/104 |
| 2005/0073438 | A1 * | 4/2005 | Rodgers et al. | 340/944 |
| 2005/0128343 | A1 * | 6/2005 | Murata et al. | 348/362 |
| 2005/0276447 | A1 * | 12/2005 | Taniguchi et al. | 382/103 |
| 2007/0109111 | A1 * | 5/2007 | Breed et al. | 340/435 |
| 2008/0097700 | A1 * | 4/2008 | Grimm | 701/301 |

FOREIGN PATENT DOCUMENTS

| | | |
|---|---|---|
| JP | 2002-288785 | 10/2002 |
| JP | 2005-025037 | 1/2005 |
| JP | 2007-225445 | 9/2007 |
| JP | 2007-241726 | 9/2007 |

OTHER PUBLICATIONS

An English translation of the Japanese Office Action of corresponding Japanese Application No. JP 2007-255592, dated Jan. 11, 2012, mailed Jan. 17, 2012.

* cited by examiner

| WEIGHTING PATTERN | DEFINING CONDITIONS |
|---|---|
| PATTERN A | • ABSOLUTE VALUE OF CHANGE IN MAGNITUDE OF MOMENTARY MOTION VECTOR IS EQUAL TO OR LARGER THAN 2 KM/H.<br>OR<br>• ABSOLUTE VALUE OF CHANGE IN ANGLE OF MOMENTARY MOTION VECTOR IS EQUAL TO OR LARGER THAN 60 DEGREES. |
| PATTERN B | • ABSOLUTE VALUE OF CHANGE IN MAGNITUDE OF MOMENTARY MOTION VECTOR IS SMALLER THAN 2 KM/H AND EQUAL TO OR LARGER THAN 1 KM/H.<br>OR<br>• ABSOLUTE VALUE OF CHANGE IN ANGLE OF MOMENTARY MOTION VECTOR IS SMALLER THAN 60 DEGREES AND EQUAL TO OR LARGER THAN 30 DEGREES. |
| PATTERN C | • ABSOLUTE VALUE OF CHANGE IN MAGNITUDE OF MOMENTARY MOTION VECTOR IS SMALLER THAN 1 KM/H.<br>OR<br>• ABSOLUTE VALUE OF CHANGE IN ANGLE OF MOMENTARY MOTION VECTOR IS SMALLER THAN 30 DEGREES. |

*FIG. 4*

| PAST DEGREE (x) | 0 | 1 | 2 | 3 | 4 |
|---|---|---|---|---|---|
| MOMENTARY MOTION VECTOR ($V_n$ -x) | $V_n - 0$ ($V_n$) | $V_n - 1$ | $V_n - 2$ | $V_n - 3$ | $V_n - 4$ |
| WEIGHTING PATTERN A | 1.0 | 0.0 | 0.0 | 0.0 | 0.0 |
| WEIGHTING PATTERN B | 0.4 | 0.3 | 0.1 | 0.1 | 0.1 |
| WEIGHTING PATTERN C | 0.2 | 0.2 | 0.2 | 0.2 | 0.2 |

*FIG. 5*

CURRENT POSITION INFORMATION REPORTING SYSTEM, INFORMATION CENTER APPARATUS, AND METHOD THEREOF

CROSS-REFERENCE TO RELATED APPLICATIONS

This application claims priority to Japanese Patent Application No. 2007-255592, filed on Sep. 28, 2007. The entire disclosure of Japanese Patent Application No. 2007-255592 is hereby incorporated herein by reference.

BACKGROUND OF THE INVENTION

1. Field of the Invention

The present invention generally relates to a current position information reporting system configured to employ an information center apparatus to report current position information of a moving body to another moving body by a wireless communication.

2. Background Information

Various technologies have been proposed in which a system uses wireless communications through an information center apparatus to report current position information of a pedestrian possessing a portable terminal to a vehicle (e.g., Japanese Laid-Open Patent Publication No. 2002-288785).

SUMMARY OF THE INVENTION

It has been discovered that in the technology disclosed in Japanese Laid-Open Patent Publication No. 2002-288785, current position information indicating a position of a pedestrian (i.e., a moving body) possessing a portable terminal (i.e., a moving body apparatus) and current position information indicating a position of a vehicle (i.e., another moving body) are managed centrally by an information center apparatus and reported from one moving body to the other and vice versa though the information center apparatus. The portable terminal possessed by the pedestrian is intended particularly for senior citizens or persons with impaired vision. The technology serves to help ensure safety.

However, with a position reporting system configured to report position information through an information center apparatus in this fashion, there is the possibility that a current position of a pedestrian will be incorrectly reported to a vehicle due to a communication delay occurring during a wireless communication from the portable terminal to the information center apparatus and/or a communication delay occurring during a wireless communication from the information center apparatus to the vehicle.

In view of the state of the known technology, one object is to provide a current position information reporting system configured to report current position information of a portable terminal possessed by a moving body via a information center apparatus.

In accordance with one aspect, an information center apparatus of a current position information reporting system is provided that basically comprises a communication section, a motion information calculating section, a communication delay time calculating section, a communication cycle waiting time calculating section, an error estimating section and a correcting section. The communication section is configured to acquire reported current position information of a first moving body apparatus by a first wireless communication with the first moving body apparatus and report a corrected current position information to a second moving body apparatus that is different from the first moving body apparatus. The motion information calculating section is configured to calculate motion information of the first moving body apparatus. The communication delay time calculating section is configured to calculate a first communication delay time that occurs during the first wireless communication between the first moving body apparatus and the information center apparatus and a second communication delay time that occurs during the second wireless communication between the information center apparatus and the second moving body apparatus. The communication cycle waiting time calculating section is configured to calculate a communication cycle waiting time associated with transmitting the reported current position information from the first moving body apparatus to the information center apparatus. The error estimating section is configured to estimate an error in the reported current position information with respect to an actual current position of the first moving body apparatus based on the motion information calculated by the motion information calculating section, the first and second communication delay times calculated by the communication delay time calculating section, and the communication cycle waiting time calculated by the communication cycle waiting time calculating section. The correcting section is configured to correct the reported current position information acquired from the first moving body apparatus via the first wireless communication using the error estimated by the error estimating section to obtain the corrected current position information.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 4 is a table presenting conditions for defining pedestrian behavior patterns;

FIG. 5 is a table presenting examples of the weights applied to the momentary motion vectors for each of the pedestrian behavior patterns;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
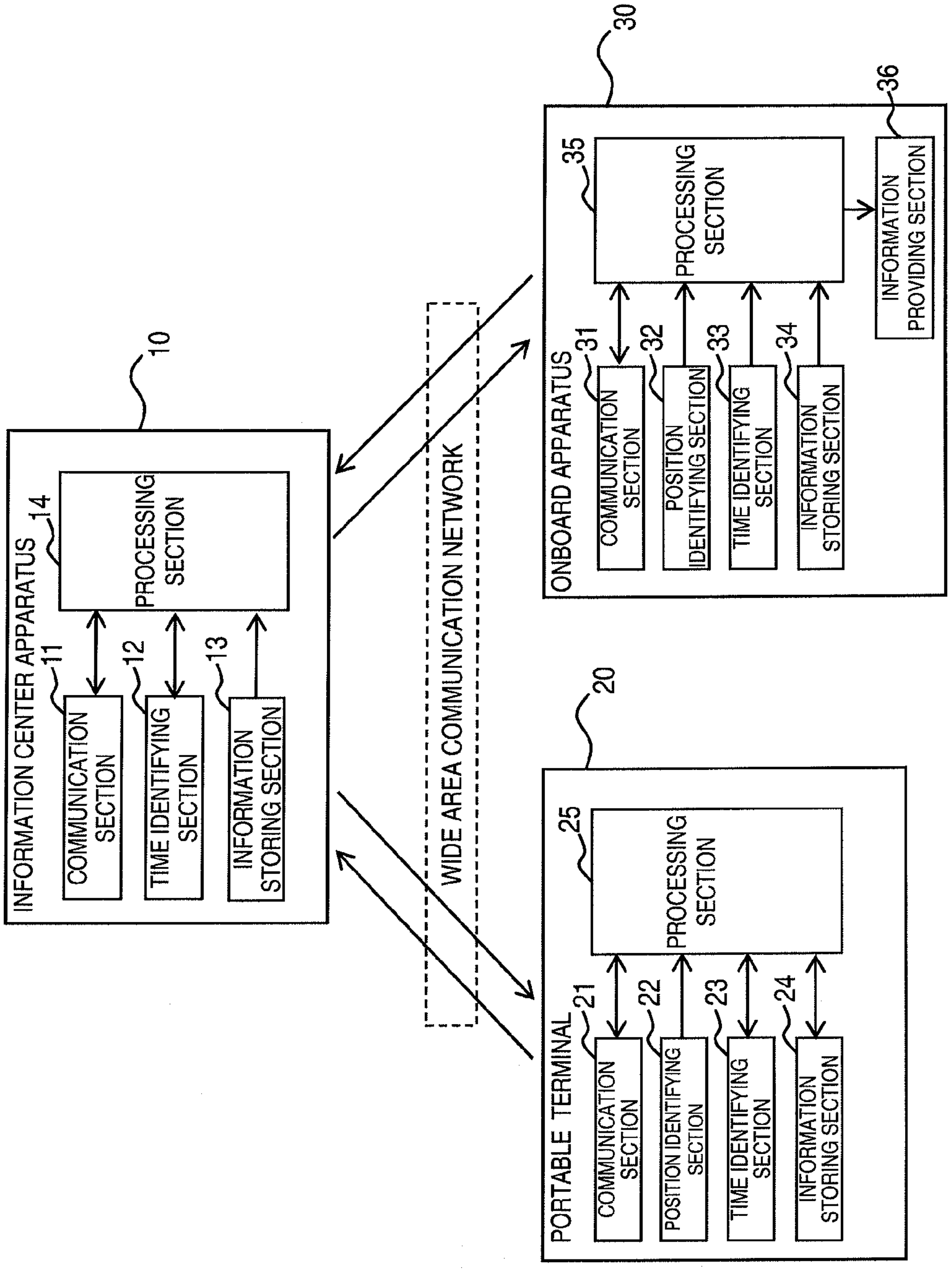
FIG. 1 is a block diagram showing basic components of a current position information reporting system in accordance with one embodiment.

Referring initially to FIG. 1, a current position information reporting system is illustrated in accordance with a first embodiment. As shown in FIG. 1, the current position information reporting system basically includes an information center apparatus 10, a plurality of portable terminals 20 (only one shown) and a plurality of onboard apparatuses 30 (only one shown). In the illustrated embodiment, each of the portable terminals 20 constitutes a first moving body apparatus that is possessed by a first moving body (e.g., pedestrians, people riding bicycles, other vehicles), while each of the onboard apparatuses 30 constitutes a second moving body apparatus that is possessed by a second moving body (e.g., pedestrians, people riding bicycles, other vehicles). The current position information reporting system is especially intended to report current position information of the first moving bodies, such as pedestrians, people riding bicycles, to drivers of vehicles (e.g., the second moving body) so that the drivers are alerted of the existence other (first) moving bodies on a road in order to urge the driver to pay attention to the moving bodies. Thus, the term "moving body" is not limited to a pedestrian. The term "moving body" refers to any moving object that includes an ability to communicate with the host vehicle directly, or indirectly. For example, in the illustrated embodiment, the first moving body apparatuses or the portable terminals 20 are mobile telephones held by pedestrians, while the second moving body apparatuses or the onboard apparatuses 30 are onboard terminals of vehicles. Thus, in the illustrated embodiment, a case is presented in which position information of the first moving body apparatuses or the portable terminals 20 (mobile telephones) are reported to the second moving body apparatuses or the onboard apparatuses 30 (vehicles) through the information center apparatus 10.

However, it is acceptable for one or two of the moving bodies to be a portable terminal held by a user riding a bicycle or portable terminal held by a user riding a motorcycle, or for a first moving body to be a bicycle and a second moving body to be a vehicle, or for two moving bodies to be both portable terminals or both vehicles. In other words, examples of other possible combinations of a first moving body apparatus and a second moving body apparatus include, but not limited to, the following cases: (i) two mobile telephones, (ii) two bicycles (i.e., two riders each having a mobile telephone), (iii) two motorcycles (i.e., two riders each having a mobile telephone), (iv) a bicycle and a car, and (v) a motorcycle and a car.

The illustrated embodiment will now be discussed in more detail as one example. The information center apparatus 10 is configured to centrally manage the current position information reporting system. The portable terminals 20 are possessed by a plurality of pedestrians (first moving bodies). The onboard apparatuses 30 are installed in host vehicles (second moving bodies that are different from the first moving bodies). The current position information reporting system is mainly configured to report current position information acquired from the portable terminals 20 to the onboard apparatuses 30 through the information center apparatus 10 by using wireless communications through a wide area communication network. As mentioned above, the first moving body and the second moving body are not limited to the illustrated embodiment.

The information center apparatus 10 basically includes a communication section 11, a time identifying section 12, an information storing section 13 and a processing section 14. The communication section 11 is configured to execute wireless communications with the portable terminals 20 and the onboard apparatuses 30. The time identifying section 12 is configured to measure a time of day. The information storing section 13 is configured to store application software to be run by the information center apparatus 10 and data necessary for the processing section 14 to execute various processing. The processing section 14 is a control device configured to control the information center apparatus 10. The information center apparatus 10 is managed by an administrator who administrates the current position information reporting system.

In the illustrated embodiment, the processing section 14 is configured to estimate an error in the reported current position information from the portable terminal 20 with respect to an actual current position of the portable terminal 20 possessed by a pedestrian (one moving body) when the reported current position information is acquired from the portable terminal 20 by a wireless communication and then corrected current position information is to be reported to the onboard apparatus 30 installed in a vehicle (another moving body) by a wireless communication. In other words, the processing section 14 uses the estimated error to correct the reported current position information acquired from the portable terminal 20.

More specifically, the processing section 14 calculates motion information of the portable terminal 20, a communication delay time occurring during wireless communication with the portable terminal 20, a communication delay time occurring during wireless communication with the onboard apparatus 30, and a communication cycle waiting time associated with transmitting the current position information from the portable terminal 20 to the information center apparatus 10. Then, based on these values, the processing section 14 calculates an estimated error. The sequence of processing steps executed by the processing section 14 in order to compensate for the error of the current position information acquired from the portable terminal 20 will be explained later in more detail.

Each of the portable terminals 20 has a communication section 21 configured to conduct wireless communications with respect to the information center apparatus 10, a position identifying section 22, a time identifying section 23 configured to measure a time of day, an information storing section 24, and a processing section 25. The portable terminal 20 is, for example, a mobile telephone or PDA (personal data assistant) having a communication function.

The position identifying section 22 is a GPS (global positioning system) configured to receive a signal transmitted from a GPS satellite with a GPS antenna in accordance with control executed by the processing section 25. The positioning identifying section 22 executes position determination using a GPS navigation method and acquires an absolute position (latitude and longitude) of the portable terminal 20 to be used as the current position information of the pedestrian. The corrected current position information of the portable terminal 20 is outputted to the processing section 25.

The information storing section 24 stores application software executed by the portable terminal 20 and various types of data.

The processing section 25 is a control device configured to centrally control the portable terminal 20. When the processing section 25 receives current position information acquired by the position identifying section 22, the processing section 25 creates a moving body (pedestrian) position information message. This moving body (pedestrian) position information message at least contains the reported current position information, identification information that enables the particular portable terminal to be identified uniquely, and a transmission time acquired by referring to the time measured by the time identifying section 23 and transmits the message to the information center apparatus 10 by controlling the communication section 21.

Each of the onboard apparatuses 30 has a communication section 31 configured to conduct wireless communications with respect to the information center apparatus 10, a position identifying section 32, a time identifying section 33 configured to measure a time of day, an information storing section 34, a processing section 35, and an information providing section 36. The onboard apparatus 30 is installed in a vehicle (moving body) and is, for example, a navigation apparatus configured to detect a current position of the vehicle and present a route to a prescribe destination by displaying a map corresponding to the current position of the vehicle generated based on map data.

The position identifying section 32 has a GPS configured to receive a signal transmitted from a GPS satellite with a GPS antenna in accordance with control executed by the processing section 35. The positioning identifying section 32 executes position determination using a GPS navigation method and acquires absolute position (latitude and longitude) information of the vehicle (moving body) in which the onboard apparatus 30 is installed. The position identifying section 32 uses an autonomous navigation method to find a relative position of the vehicle based on traveling distance information obtained from a distance sensor (not shown) and advancement direction information obtained from a direction sensor (not shown).

The position identifying 32 also calculates a position of the vehicle in which the onboard apparatus 30 is installed on a map based on the absolute position (latitude and longitude) information and the relative position information. The calculated current position information of the vehicle is outputted to the processing section 35.

The information storing section 34 stores application software executed by the navigation apparatus, map data for displaying maps, road data for map matching and route guidance, and various other data necessary for navigation.

The processing section 35 is a control device configured to centrally control the onboard apparatus 30. Based on the current position information outputted from the position identifying section 32, the processing section 35 executes control to obtain corresponding map information, road information, and other information necessary for navigation by reading the information from a storage section (not shown) or acquiring the information from the information center apparatus 10 by wireless communication.

The processing section 35 uses a destination inputted by a user and the current position information to present an optimum route from the current position of the destination and execute route guidance (navigation) to a region in the vicinity of the destination. The processing section 35 can also control a sound emitting section (not shown) provided in the onboard apparatus 30 to execute navigation by voice.

The processing section 35 also generates a display image to be displayed on the information providing section 36. For example, the processing section 35 generates a map to be displayed for visual navigation and also functions to generate and display a display image that includes current position information of a portable terminal 20

The information providing section 36 is a liquid crystal display or other display device configured to display a display image generated by the processing section 35. The information providing section 36 is arranged in a position where it can be easily viewed by a user, particularly by a driver if it is installed in a vehicle. It is acceptable for the information providing section 36 to be a touch panel display.

In the current position information reporting system according to the illustrated embodiment, an error exists between the reported current position information acquired from the portable terminal 20 and an actual current position of the portable terminal 20 when the reported current position information acquired from the portable terminal 20 is reported to an onboard apparatus 30 via the information center apparatus 10. The processing executed in order to compensate for this error will now be explained.

As explained above, the error can be assumed to occur due to the following three factors: a communication delay time occurring during a wireless communication between the portable terminal 20 and the information center apparatus 10, a communication delay time occurring during a wireless communication between the information center apparatus 10 and the onboard apparatus 30, and a communication cycle waiting time associated with transmitting the current position information from the portable terminal 20 to the information center apparatus 10. Since each of the factors causing the error occur independently, a compensating effect can be obtained by executing compensation processing with respect to each of the factors individually. Furthermore, an even more accurate compensation processing can be executed by combining the individual compensation processing operations.

Figure 2:
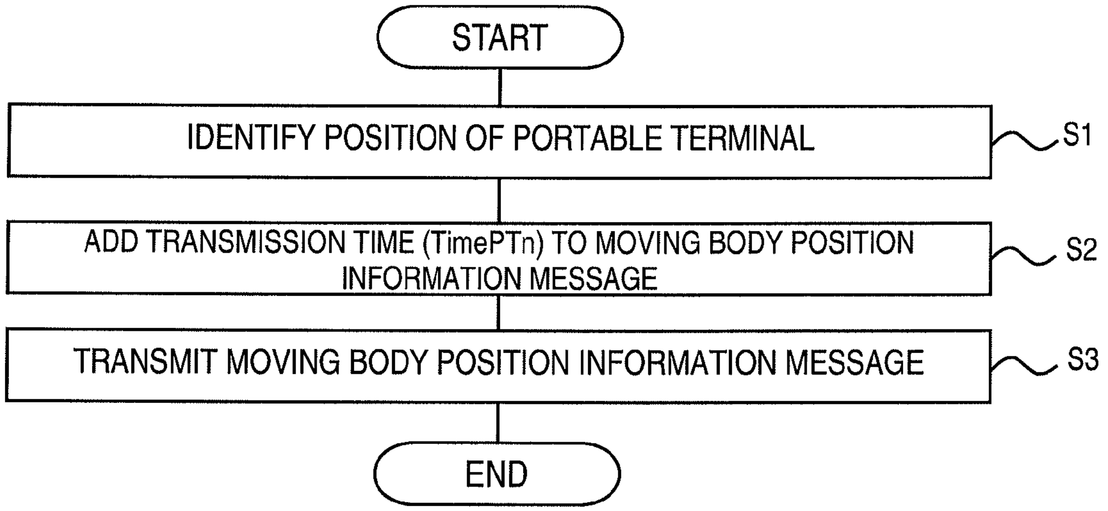
FIG. 2 is a flowchart showing the control processing steps executed when a moving body apparatus (e.g., portable terminal) transmits a moving body (pedestrian) position information message to an information center apparatus.
Figure 3:
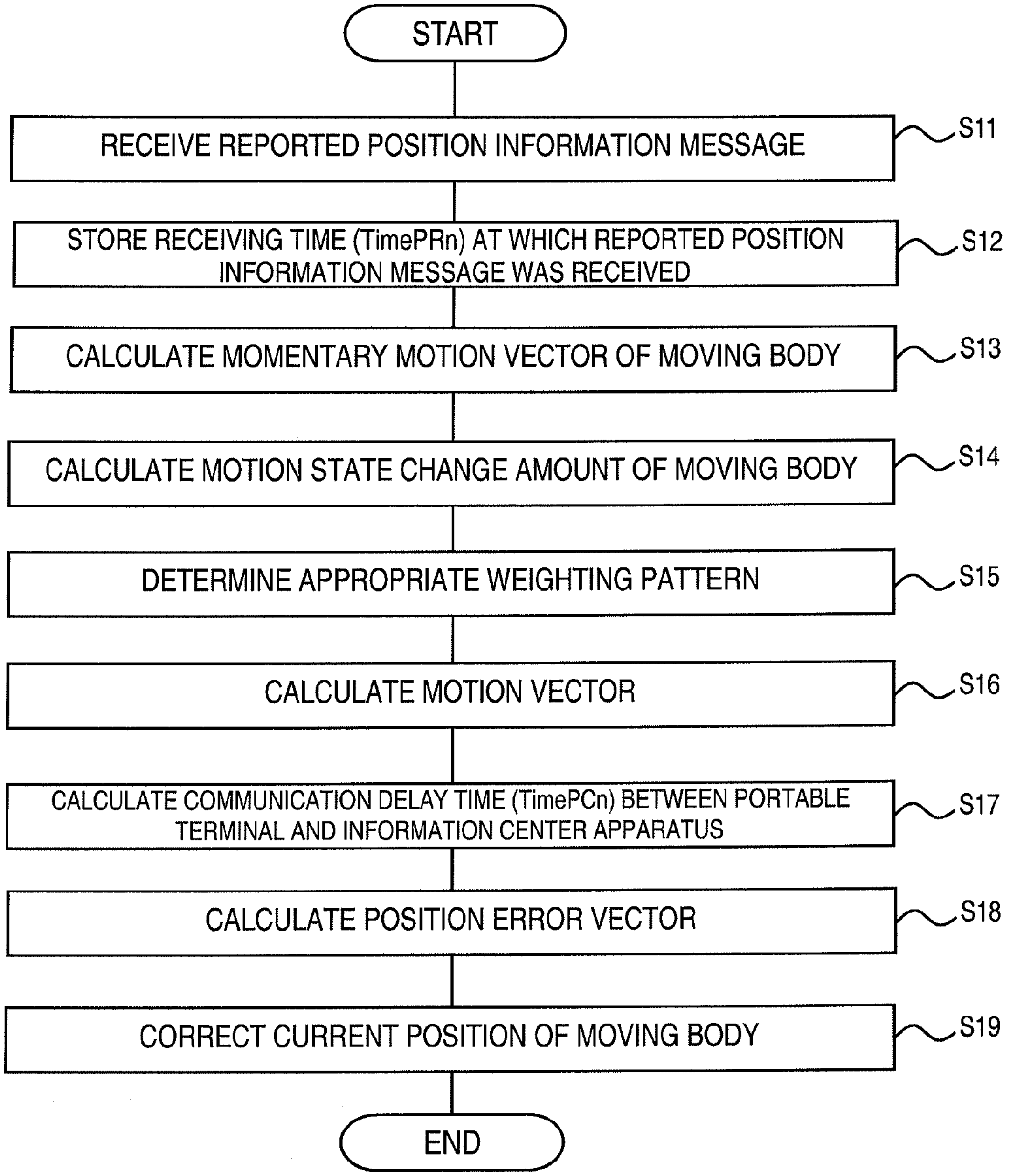
FIG. 3 is a flowchart showing compensation processing steps executed by the information center apparatus to correct current position information to compensate for error.

The processing operations executed in order to compensate for the error resulting from the communication delay time that occurs during a wireless communication between the portable terminal 20 and the information center apparatus 10 will now be explained using the flowcharts of FIGS. 2 and 3. This compensation processing is executed periodically and it is assumed that the processing steps explained using the flowcharts of FIGS. 2 and 3 are being executed for the nth time.

First, the processing operations executed when the portable terminal 20 transmits a moving body (pedestrian) position information message to the information center apparatus 10 will be explained using the flowchart shown in FIG. 2.

In step S1, the processing section 25 of the portable terminal 20 controls the position identifying section 22 so as communicate wirelessly with a GPS satellite and acquire current position information (latitude and longitude information) of the portable terminal 20, thereby identifying the current position of the portable terminal 20.

In step S2, the processing section 25 creates the moving body (pedestrian) position information message that includes the current position information acquired in step S1, a time at which the current position information was acquired, and an identifier that identifies the portable terminal 20 uniquely. The processing section 25 also obtains a transmission time (TimePTn) at which the moving body (pedestrian) position information message will be transmitted by referring to a time measured by the time identifying section 23 and adds the transmission time to the moving body (pedestrian) position information message.

In step S3, the processing section 25 controls the communication section 21 so as to transmit the moving body (pedestrian) position information message created in step S2 to the information center apparatus 10. Since the interval between steps S2 and S3 is very short, the time lag between the transmission time (TimePTn) added to the moving body (pedestrian) position information message in step S2 and the actual time when the message is transmitted to the information center apparatus 10 in step S3 can be ignored.

The processing operations executed by the information center apparatus 10 in order to correct the reported current position information from the moving body (pedestrian) position information message and compensate for the error will now be explained using the flowchart shown in FIG. 3.

In step S11, the processing section 14 of the information center apparatus 10 receives the moving body (pedestrian) position information message transmitted wirelessly from the portable terminal 20 through the communication section 11. The processing section 14 extracts from the moving body (pedestrian) position information message all of the information that will be necessary in later steps, e.g., the reported current position information and the transmission time (TimePTn), and stores all of the information in the information storing section 13.

In step S12, in response to receiving the moving body (pedestrian) position information message, the processing section 14 refers to a time measured by the time identifying section 12 and stores it in the information storing section 13 as a receiving time (TimePRn) indicating when the moving body (pedestrian) position information message was received.

In step S13, the processing section 14 calculates a momentary position vector of the moving body (pedestrian) based on the reported current position information and times when the reported current position information was acquired contained in the moving body (pedestrian) position information messages received during the current processing cycle and the previous processing cycle, i.e., the nth time the control sequence was executed and the (n−1) the time the control sequence was executed.

Since the reported current position information is defined in terms of latitude and longitude, the current position information can be expressed as (LAn, LOn), where LA is latitude information and LO is longitude information. Thus, the reported current position information received in the $n^{th}$ processing cycle can be expressed as (LAn, LOn) and the reported current position information received in the $(n-1)^{th}$ cycle can be expressed as ($LA_{n-1}$, $LO_{n-1}$). The reported current position information can then be used to calculate a momentary motion vector using the equations 1 and 2 shown below.

Magnitude of Momentary Motion Vector $$(|Vn|)=\sqrt{((LA_n)-(LA_{n-1}))^2+((LO_n)-(LO_{n-1}))^2} \tag{1}$$

Direction of Momentary Motion Vector $$(\angle Vn)=\left(\arctan\left(\frac{(LA_n-LA_{n-1})}{(LO_n-LO_{n-1})}\right)\right) \tag{2}$$

The direction of a momentary motion vector expressed by the equations (1) and (2) is expressed in terms of a direction angle measured in a clockwise direction from a reference direction where the direction angle is assumed to be 0 (zero) degrees. The reference direction is due north. The units of the magnitude and direction of a momentary motion vector expressed by the equations (1) and (2) are converted as necessary.

In step S14, the processing section 14 calculates motion state change amounts (magnitude and direction) of the pedestrian using the equations (3) and (4) shown below. These equations express a difference (vector difference) between the momentary motion vector calculated in the $n^{th}$ processing cycle and the momentary motion vector calculated in the $(n-1)^{th}$ processing cycle. The motion state change amounts can be used to ascertain a momentary behavior of the pedestrian possessing the portable terminal 20.

$$\text{Magnitude of change in motion state}=|(|V_n|-|V_{n-1}|)| \tag{3}$$

$$\text{Direction of change in motion state}=|(\angle V_n-\angle V_{n-1})| \tag{4}$$

In step S15, based on the motion state change amounts calculated in step S14, the processing section 14 determines a weight to be applied to each of the momentary motion vectors when a motion vector is calculated based on an average value of the momentary motion vectors in a subsequent step. The weights applied to the momentary motion vectors can be determined in advance based on motion state change amounts indicating the momentary behavior of the pedestrian. Thus, for example, the weights can be stored in the information storing section 13 of the information center apparatus 10 as patterns as shown in FIG. 4.

In the example shown in FIG. 4, the behavior of the pedestrian possessing the portable terminal 20 is categorized into any one of three pedestrian behavior patterns, i.e., Pattern A, Pattern B or Pattern C, in accordance with the moving state change amounts calculated in step S14. As shown in FIG. 4, the conditions defining Pattern A correspond to a situation in which the motion state change amounts indicate that the pedestrian is turning left or right or has decelerated abruptly. The conditions defining Pattern B correspond to a situation in which the motion state change amounts indicate that the pedestrian is turning slightly left or right or decelerating, but not as much as in the case of Pattern A. The conditions defining Pattern C correspond to a situation in which the motion state change amounts indicate that the pedestrian is moving generally in a straight line at a substantially constant speed.

The number of pedestrian behavior patterns is not limited to three as shown in FIG. 4. It is also acceptable to have only two categories of pedestrian behavior or, conversely, to divide the pedestrian behavior more finely into four or more categories and increase the number of patterns accordingly. In any case, the weights to be applied to the momentary motion vectors when calculating a motion vector based on an average value of the momentary motion vectors in a subsequent step are determined by ascertaining the behavior of the pedestrian as described above.

In step S16, the processing section 14 finds a motion vector by calculating an average value of the momentary motion vectors calculated in the $n^{th}$ processing cycle and at least one past processing cycle occurring successively prior to the $n^{th}$ processing cycle. The momentary motion vectors used in the average calculation are weighted based on the pedestrian behavior pattern selected in step S15, which was determined, based on the motion state change amounts and reflects the behavior of the pedestrian possessing the portable terminal 20. Similar to the pedestrian behavior patterns, the weights (weighting factors) are stored in advance in the information storing section 13 of the information center apparatus 10 as shown in FIG. 5.

The weighting patterns shown in FIG. 5 correspond to the patterns shown in FIG. 4 and provide weights for the momentary vectors calculated in the $n^{th}$ to $(n-4)^{th}$ processing cycles, i.e., processing cycles with past degrees (x) ranging from 0 to 4 (x=0 to 4). The past degree is a value defining which processing cycle a weight corresponds to relative to the current processing cycle. A past degree of zero (x=0) means the weight is applied to the momentary motion vector calculated in the $n^{th}$ processing cycle, and a past degree larger than zero (x=1 or larger) means the weight is applied to a momentary motion vector calculated in the past by a number of processing cycles equal to x.

As indicated in FIG. 5, the weights applied to momentary motion vectors calculated one to four (past degree x=1 to 4) cycles in the past are set to zero (0) in Pattern A, which corresponds to a situation in which it can be assumed that the pedestrian is turning right or left or decelerating abruptly, and only the current momentary motion vector is weighted. Meanwhile, in Pattern C, which corresponds to a situation in which it can be assumed that the pedestrian is moving generally in a straight line at a substantially constant speed, the same weight value is applied to all of the momentary motion vectors calculated in the current and the past four processing cycles (past degree x=0 to 4). As a result, when a motion vector is found by calculating an average value of a plurality of momentary motion vectors ranging from the current processing cycle into the past, the behavior of the pedestrian can be reflected correctly in the calculated motion vector. Also, by calculating the motion vector in this way, fluctuations resulting from multi-path noise and other types of noise can be smoothed.

If in step S15 the behavior of the pedestrian is determined to correspond to Pattern B based on the motion state change amounts, then the motion vector found by calculating average values of the momentary motion vectors after the momentary motion vectors are weighted as shown in FIG. 5 can be expressed as shown in the equations (5) and (6) below.

Magnitude of Motion Vector $$(|Un|)=0.4\times|V_n|+0.3\times|V_{n-1}|+0.1\times|V_{n-2}|+0.1\times|V_{n-3}|+0.1\times|V_{n-4}| \quad (4)$$

Direction of Motion Vector $$(\angle Un)=0.4\times\angle V_n+0.3\times\angle V_{n-1}+0.1\times\angle V_{n-2}+0.1\times\angle V_{n-3}+0.1\times\angle V_{n-4}| \quad (6)$$

When four or more past momentary motion vectors have not been stored (e.g., n<4), the motion vector is calculated using only the momentary motion vectors that are stored. For example, if n=3, then the motion vector is calculated using only the momentary motion vectors V3, V2, and V1.

In step S17, the processing section 14 uses the equation (7) shown below to calculate a first communication delay time (TimePCn) that occurs during wireless communication between the portable terminal 20 and the information center apparatus 10 based on a difference between the receiving time (TimePRn) and the transmission time (TimePTn) stored in the information storing section 13.

First Communication Delay Time $$(\text{Time}PCn)=(\text{Time}PRn)-(\text{Time}PTn) \quad (7)$$

In step S18, the processing section 14 uses the motion vector calculated in step S16 and the first communication delay time (TimePCn) calculated in step S17 in the equations (8) and (9) shown below to calculate a position error vector indicating an error with respect to an actual position of the portable terminal 20 possessed by the pedestrian that occurs during the wireless communication between the portable terminal 20 and the information center apparatus 10.

$$\text{Magnitude of position error vector}=(\text{Magnitude of motion vector})\times(\text{Time}PCn) \quad (8)$$

$$\text{Direction of position error vector}=(\text{Direction of motion vector}) \quad (9)$$

In step S19, the processing section 14 takes the reported current position information of the portable terminal 20 that was included in the moving body (pedestrian) position information message received in step S11 and stored in the information storing section 13 and executes compensation processing whereby the reported current position information is shifted by the amount of the position error vector calculated in step S18. In the explanation that follows, the reported current position information stored in the information storing section 13 is expressed as (LAn, LOn) and the corrected current position information obtained by executing the compensation processing in step S19 is expressed as (LA'n, LO'n).

In this way, the current position information reporting system in accordance with the illustrated embodiment can accurately compensate for the error that results from a communication delay time occurring during a wireless communication between the portable terminal 20 and the information center apparatus 10 based on a motion vector (motion information) of the portable terminal 20 and the first communication delay time (TimePCn) occurring during the wireless communication between the portable terminal 20 and the information center apparatus 10. As a result, the current position information indicating the current position of the portable terminal 20 possessed by a pedestrian can be reported correctly to the onboard apparatus 30 installed in a vehicle to which it has been determined the current position information should be reported.

By weighting the momentary motion vectors in accordance with the motion state change amounts, the behavior of the pedestrian possessing the portable terminal 20 can be reflected correctly when the motion vector is calculated based on average values of the momentary motion vectors. As a result, the accuracy of the position error vector can be increased.

Figure 6:
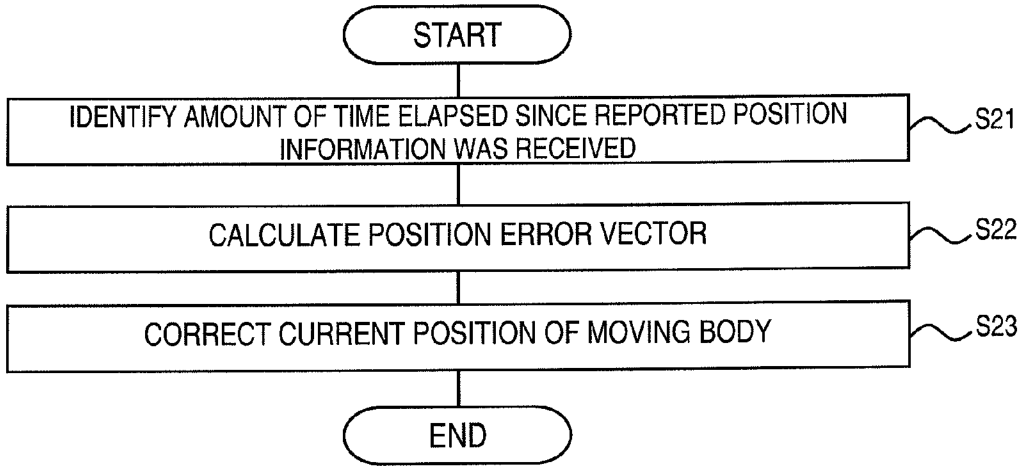
FIG. 6 is a flowchart showing the processing steps executed to compensate for error resulting from a communication cycle waiting time.

The processing operations executed in order to compensate for the error resulting from a communication cycle waiting time that occurs when the portable terminal 20 transmits the reported current position information to the information center apparatus 10 will now be explained with reference to FIG. 6.

In a system in which the portable terminals 20 report the current position information to the onboard apparatuses 30 through the information center apparatus 10, there are generally a plurality of the portable terminals 20 attempting to access the information center apparatus 10. Thus, a waiting time occurs during a cycle period according to which the reported current position information is transmitted to the information center apparatus 10 from the portable terminals 20. If the communication cycle waiting time is large, then the timing at which the reported current position information stored in the information center apparatus 10 is updated will be delayed. Consequently, an error will exist with respect to an actual current position of the portable terminal 20 possessed by the pedestrian.

The processing executed in order to compensate for the error resulting from a communication cycle waiting time that occurs when the portable terminal 20 transmits reported current position information to the information center apparatus 10 is executed at a shorter cycle period (more frequently) than the processing executed in order to compensate for the error resulting from a communication delay time occurring between the portable terminal 20 (explained previously) and the processing executed in order to compensate for the error resulting from a communication delay time occurring between the information center apparatus 10 and the onboard apparatus 30 (explained later). It is assumed that the processing steps explained using the flowchart of FIG. 6 are being executed for the $n^{th}$ time.

In step S21, the processing section 14 of the information center apparatus 10 uses the equation (10) shown below to calculate an elapsed time (TimeSn) indicating the amount of time elapsed since the moving body (pedestrian) position information message was received based on a difference between a current time acquired by referring to a time measured by the time identifying section 12 and the receiving time (TimePRn) at which the moving body (pedestrian) position information message stored in the information storing section 13 was received.

$$\text{Time elapsed since receiving message (Time}Sn\text{)}=\text{(current time)}-\text{(Time}PRn\text{)} \quad (10)$$

In step S22, the processing section 14 uses the motion vector calculated in step S16 and the elapsed time (TimeSn) since the moving body (pedestrian) position information message was received calculated in step S21 in the equations (11) and (12) shown below to calculate a position error vector indicating an error with respect to an actual position of the portable terminal 20 possessed by the pedestrian that occurs due to the communication cycle waiting time associated with transmitting current position information from the portable terminal 20 to the information center apparatus 10.

$$\text{Magnitude of position error vector}=\text{(magnitude of motion vector)}\times\text{(Time}Sn\text{)} \quad (11)$$

$$\text{Direction of position error vector}=\text{(direction of motion vector)} \quad (12)$$

In step S23, the processing section 14 executes compensation processing whereby the reported current position information of the portable terminal 20 that is currently stored in the information storing section 13 is shifted by the amount of the position error vector calculated in step S22. In the explanation that follows, the corrected current position information that results from correcting the reported current position information stored in the information storing section 13 to compensate for the error caused by the communication delay time between the portable terminal 20 and the information center apparatus 10 is expressed as (LA'n, LO'n) and the corrected current position information that results after the compensation processing executed in this processing step is expressed as (LA"n, LO"n).

In this way, the current position information reporting system in accordance with the illustrated embodiment can accurately compensate for the error caused by a communication cycle waiting time that occurs when the current position information is transmitted from the portable terminal 20 to the information center apparatus 10 by correcting the reported current position information based on a motion vector (motion information) of the portable terminal 20 and an elapsed time (TimeSn) since the moving body (pedestrian) position information message was received. As a result, the current position information indicating the current position of a portable terminal possessed by a pedestrian can be reported correctly to the onboard apparatus 30 installed in a vehicle to which it has been determined the current position information should be reported.

By weighting the momentary motion vectors in accordance with the motion state change amounts, the behavior of the pedestrian possessing the portable terminal 20 can be reflected correctly when the motion vector is calculated based on average values of the momentary motion vectors. As a result, the accuracy of the position error vector can be increased.

Figure 7:
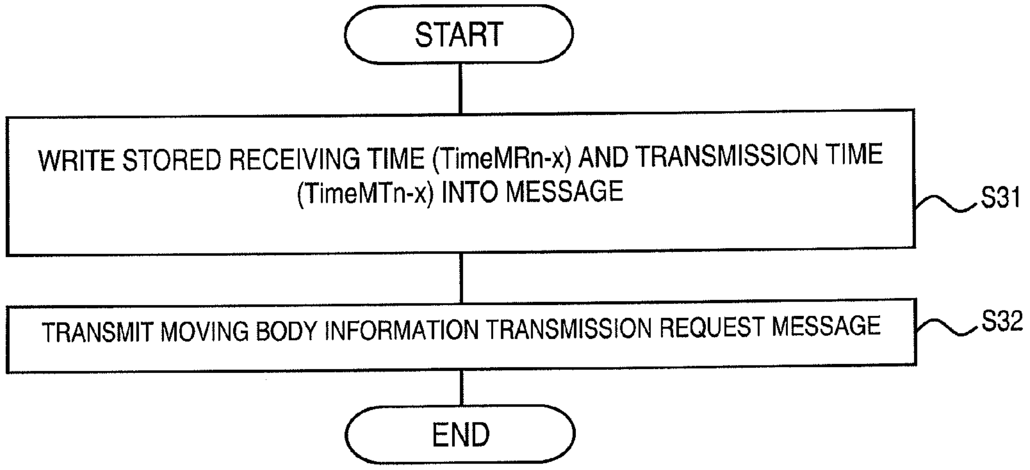
FIG. 7 is a flowchart showing the processing steps executed when the onboard apparatus transmits a moving body (pedestrian) information transmission request message to the information center apparatus.
Figure 8:
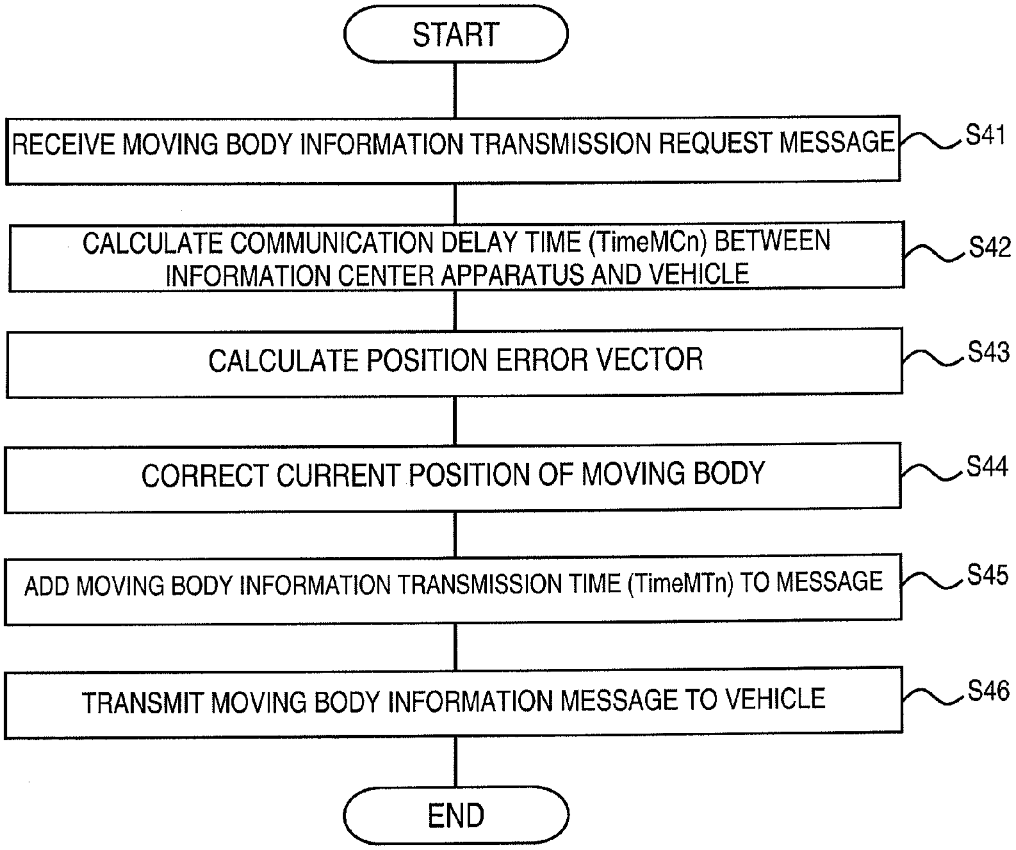
FIG. 8 is a flowchart showing the compensation processing steps executed by the information center apparatus to correct current position information to compensate for error.
Figure 9:
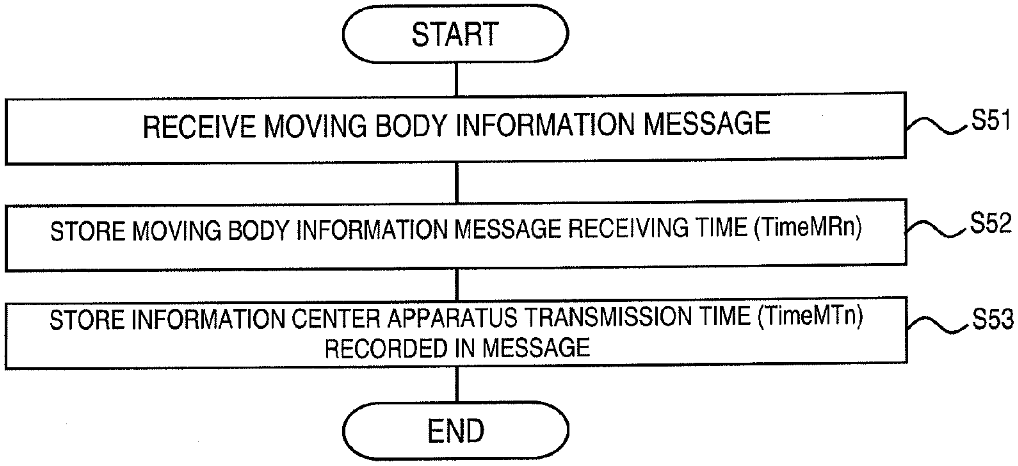
FIG. 9 is a flowchart showing the processing steps executed by the onboard apparatus when it receives a moving body (pedestrian) information message transmitted from the information center apparatus.

The processing operations executed in order to compensate for the error resulting from the communication delay time that occurs during a wireless communication between the information center apparatus 10 and the onboard apparatus 30 will now be explained using the flowcharts of FIGS. 7 and 9. This compensation processing is executed periodically and it is assumed that the processing steps explained using the flowcharts of FIGS. 7 to 9 are being executed for the $n^{th}$ time First, the processing operations executed when an online apparatus 30 transmits a moving body (pedestrian) information transmission request message to the information center apparatus 10 will be explained using the flowchart shown in FIG. 7.

In step S31, the processing section of the onboard apparatus 30 transmits two pieces of information to the information center apparatus 10 that are necessary for the information center apparatus 10 to calculate the communication delay time that occurs during a wireless communication between the information center apparatus 10 and the onboard apparatus 30.

The two pieces of information are a receiving time ($\text{TimeMR}_{n-x}$) indicating a time when the reported current position information transmitted from the information center apparatus 10 during the $(n-1)^{th}$ or earlier processing cycle was received and a transmission time ($\text{TimeMT}_{n-x}$) indicating a time when the information center apparatus 10 transmitted current position information to the onboard apparatus 30 during the $(n-1)^{th}$ or earlier processing cycle. The x in the receiving time ($\text{TimeMR}_{n-x}$) and the transmission time ($\text{TimeMT}_{n-x}$) is a value equal to or smaller than n−1.

The receiving time ($\text{TimeMR}_{n-x}$) and the transmission time ($\text{TimeMT}_{n-x}$) are generated by the processing section 35 and added to a moving body (pedestrian) information transmission request message that includes at least an identifier that uniquely identifies the onboard apparatus 30. The moving body (pedestrian) information transmission request message is a message for requesting the information center apparatus 10 to transmit current position information and is transmitted from the onboard apparatus 30 to the information center apparatus 10.

The receiving time (TimeMRn−x) and the transmission time (TimeMTn−x) are stored in the information storing section 34 of the onboard apparatus 30 during the $(n-1)^{th}$ or earlier processing cycle. If a receiving time (TimeMRn−x) and a transmission time (TimeMTn−x) are not stored in the information storing section 34 (e.g., when n=0), then the processing section 35 adds information indicating that the two pieces of information are not stored in the onboard unit 30 to the moving body (pedestrian) information transmission request message such that the information center apparatus 10 can recognize that the information is not available.

In step S32, the processing section 35 controls the communication section 31 so as to transmit the moving body (pedestrian) information transmission request message created in step S31 to the information center apparatus 10.

The processing operations executed by the information center apparatus 10 in order to correct the reported current position information and compensate for the error will now be explained using the flowchart shown in FIG. 8.

In step S41, the processing section 14 of the information center apparatus 10 receives the moving body (pedestrian) information transmission request message transmitted wirelessly from the onboard apparatus 30 through the communication section 11. The processing section 14 extracts from the moving body (pedestrian) information transmission request message all of the information that will be necessary in later steps, e.g., the receiving time (TimeMRn−x) and the transmission time (TimeMTn−x), and stores all of the information in the information storing section 13.

In step S42, the processing section 14 uses the equation (13) shown below to calculate a second communication delay time (TimeMCn) that occurs during wireless communication between the onboard apparatus 30 and the information center apparatus 10 based on a difference between the receiving time (TimeMRn−x) and the transmission time (TimeMTn−x) stored in the information storing section 13.

Second Communication delay time $$(\mathrm{Time}MCn)=(\mathrm{Time}MRn-x)-(\mathrm{Time}MTn-x) \quad (13)$$

If the moving body (pedestrian) information transmission request message received in step S41 includes information indicating that a receiving time (TimeMRn−x) and a transmission time (TimeMTn−x) are not stored in the onboard apparatus, then the processing section 14 uses a pre-entered value that estimates the second communication delay time as the communication delay time (TimeMCn).

In step S43, the processing section 14 uses the motion vector calculated in step S16 of the flowchart shown in FIG. 3 and the second communication delay time (TimeMCn) calculated in step S42 in the equations (14) and (15) shown below to calculate a position error vector indicating an error with respect to an actual position of the portable terminal 20 possessed by the pedestrian that occurs during the wireless communication between the onboard apparatus 30 and the information center apparatus 10.

$$\text{Magnitude of position error vector}=(\text{magnitude of motion vector})\times(\mathrm{Time}MCn) \quad (14)$$

$$\text{Direction of position error vector}=(\text{direction of motion vector}) \quad (15)$$

In step S44, the processing section 14 executes compensation processing whereby the current position information of the portable terminal 20 that is currently stored in the information storing section 13 is shifted by the amount of the position error vector calculated in step S43. In the explanation that follows, the corrected current position information that results from correcting the current position information stored in the information storing section 13 to compensate for the error caused by the first communication delay time between the portable terminal 20 and the information center apparatus 10 and the error caused by the communication cycle waiting time is expressed as (LA"n, LO"n) and the corrected current position information that results after the compensation processing executed in this processing step is expressed as (LA'"n, LO'"n).

In step S45, in response to the moving body (pedestrian) information transmission request message received in step S41, the processing section 14 creates a moving body (pedestrian) information message that includes the corrected current position information of the portable terminal 20 stored in the information storing section 13 and the transmission time (TimeMTn) at which the current position information will be transmitted to the onboard apparatus 30.

In step S46, the processing section 14 controls the communication section 11 so as to transmit the moving body (pedestrian) information message created in step S45 to the onboard apparatus 30.

Finally, the processing operations executed by an onboard apparatus 30 when it receives a moving body (pedestrian) information message will be explained using the flowchart shown in FIG. 9.

In step S51, the processing section 35 of the onboard apparatus 30 receives the moving body (pedestrian) information message transmitted wirelessly from the information center apparatus 10 through the communication section 31.

In step S52, in response to receiving the moving body (pedestrian) information message, the processing section 35 refers to a time measured by the time identifying section 33 and stores it in the information storing section 34 as a receiving time (TimeMRn) indicating when the moving body (pedestrian) information message was received.

In step S53, the processing section 35 takes the transmission time (TimeMTn) and other information required for the processing of subsequent steps from the moving body (pedestrian) information message and stores it in the information storing section 34. In this way, the current position information reporting system in accordance with the illustrated embodiment can accurately compensate for the error that results from a communication delay time occurring during a wireless communication between the information center apparatus 10 and the onboard apparatus 30 based on a motion vector (motion information) of the portable terminal 20 and a communication delay time (TimeMCn) occurring during a wireless communication between the information center apparatus 10 and the onboard apparatus 30. As a result, current position information indicating the current position of a portable terminal possessed by a pedestrian can be reported correctly to the onboard apparatus 30 installed in a vehicle to which it has been determined the current position information should be reported.

By weighting the momentary motion vectors in accordance with the motion state change amounts, the behavior of the pedestrian possessing the portable terminal 20 can be reflected correctly when the motion vector is calculated based on average values of the momentary motion vectors. As a result, the accuracy of the position error vector can be increased.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, although in the embodiment described above, motion information (a motion vector) of the portable terminal 20 is calculated, the invention is not limited to such an application. The present invention can also be employed to calculate motion information (a motion vector) of a vehicle and report position information of the vehicle to the portable terminal 20 through the information center apparatus 10. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A current position information reporting system comprising:

a first moving body apparatus carried by a first moving body;

a second moving body apparatus carried by a second moving body that is different from the first moving body; and an information center apparatus, including a control device and a communication section, the communication section being configured to acquire reported current position information of the first moving body apparatus via a first wireless communication with the first moving body apparatus and to report corrected current position information of the first moving body apparatus via a second wireless communication to the second moving body apparatus, the control device including a motion information calculating section configured to calculate motion information of the first moving body apparatus, the motion information including a plurality of momentary motion vectors each calculated based on at least two points where the first moving body apparatus existed, and an average motion vector calculated based on an average value of the plurality of momentary motion vectors spanning from a past point in time to a current point in time, a communication delay time calculating section configured to calculate a first communication delay time that occurs during the first wireless communication between the first moving body apparatus and the information center apparatus and a second communication delay time that occurs during the second wireless communication between the information center apparatus and the second moving body apparatus, a communication cycle waiting time calculating section configured to calculate a communication cycle waiting time associated with transmitting the reported current position information of the first moving body apparatus from the first moving body apparatus to the information center apparatus, the communication cycle waiting time is calculated based on a difference between a current time and a time when the reported current position information transmitted from the first moving body apparatus was received, an error estimating section configured to calculate a position error vector to indicate an estimated error in the reported current position information of the first moving body apparatus with respect to an actual current position of the first moving body apparatus based on the motion information calculated by the motion information calculating section, the first and second communication delay times calculated by the communication delay time calculating section, and the communication cycle waiting time calculated by the communication cycle waiting time calculating section, and a correcting section configured to correct the reported current position information of the first moving body apparatus acquired from the first moving body apparatus via the first wireless communication by shifting the reported current position information by the amount of the position error vector estimated by the error estimating section to obtain the corrected current position information of the first moving body apparatus.

2. The current position information reporting system as recited in claim 1, wherein the motion information calculating section is further configured to identify a change in a motion state of the first moving body apparatus based on a change amount of a momentary motion vector and calculate the average motion vector as a weighted average value of the momentary motion vectors by weighting the momentary motion vectors in accordance with the identified change in motion state.

3. The current position information reporting system as recited in claim 1, wherein the communication delay time calculating section is further configured to calculate a communication delay time that occurs during a wireless communication between the first moving body apparatus and the information center based on a difference between a transmission time at which the reported current position information is transmitted from the first moving body apparatus and a time at which the information center receives the reported current position information.

4. The current position information reporting system as recited in claim 1, wherein the communication delay time calculating section is further configured to calculate a communication delay time that occurs during a wireless communication between the information center and the second moving body apparatus based on a difference between a transmission time at which the corrected current position information is transmitted to the second moving body apparatus and a time at which the second moving body apparatus receives the corrected current position information.

5. A current position information reporting method comprising:

transmitting, by a first moving body apparatus carried by a first moving body, a communication indicating current position information of the first moving body apparatus;

receiving, by the communication section of an information center apparatus including a control device and said communication section, the communication indicating the current position information of the first moving body apparatus;

calculating, by a motion information calculating section of the control device, motion information of the first moving body apparatus, the motion information including a plurality of momentary motion vectors each calculated based on at least two points where the first moving body apparatus existed, and an average motion vector calculated based on an average value of the plurality of momentary motion vectors spanning from a past point in time to a current point in time;

calculating, by a communication delay time calculating section of the control device, a first communication delay time that occurs during the first wireless communication between the first moving body apparatus and the information center apparatus and a second communication delay time that occurs during the second wireless communication between the information center apparatus and the second moving body apparatus;

calculating, by a communication cycle waiting time calculating section of the control device, a communication cycle waiting time associated with transmitting the reported current position information of the first moving body apparatus from the first moving body apparatus to the information center apparatus, the communication cycle waiting time is calculated based on a difference between a current time and a time when the reported current position information transmitted from the first moving body apparatus was received;

calculating, by an error estimating section of the control device, a position error vector to indicate an estimated error in the reported current position information of the first moving body apparatus with respect to an actual current position of the first moving body apparatus based on the motion information calculated by the motion information calculating section, the first and second communication delay times calculated by the communication delay time calculating section, and the communication cycle waiting time calculated by the communication cycle waiting time calculating section;

correcting, by a correcting section of the control device, the reported current position information of the first moving body apparatus acquired from the first moving body apparatus via the first wireless communication by shifting the reported current position information by the amount of the position error vector estimated by the error estimating section to obtain the corrected current position information of the first moving body apparatus;

transmitting, by the communication section of information center apparatus, a second wireless communication to a second moving body apparatus carried by a second moving body that is different from the first moving body, the second wireless communication reporting the corrected current position information of the first moving body apparatus; and receiving, by the second moving body apparatus, the second wireless communication reporting the corrected current position information of the first moving body apparatus.

6. The current position information reporting method as recited in claim 5, further comprising identifying, by the motion information calculating section of the control device, a change in a motion state of the first moving body apparatus based on a change amount of a momentary motion vector and calculate the average motion vector as a weighted average value of the momentary motion vectors by weighting the momentary motion vectors in accordance with the identified change in motion state.

7. The current position information reporting method as recited in claim 5, further comprising calculating, by the communication delay time calculating section of the control device, a communication delay time that occurs during a wireless communication between the first moving body apparatus and the information center based on a difference between a transmission time at which the reported current position information is transmitted from the first moving body apparatus and a time at which the information center receives the reported current position information.

8. The current position information reporting method as recited in claim 5, further comprising calculating, by the communication delay time calculating section of the control device, a communication delay time that occurs during a wireless communication between the information center and the second moving body apparatus based on a difference between a transmission time at which the corrected current position information is transmitted to the second moving body apparatus and a time at which the second moving body apparatus receives the corrected current position information.

* * * * *